(12) United States Patent
Ravichandran et al.

(10) Patent No.: US 10,963,754 B1
(45) Date of Patent: Mar. 30, 2021

(54) PROTOTYPICAL NETWORK ALGORITHMS FOR FEW-SHOT LEARNING

(71) Applicant: Amazon Technologies, Inc., Seattle, WA (US)

(72) Inventors: Avinash Aghoram Ravichandran, Shoreline, WA (US); Paulo Ricardo dos Santos Mendonca, Seattle, WA (US); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 16/144,927

(22) Filed: Sep. 27, 2018

(51) Int. Cl.
| | | |
|---|---|---|
| *G06K 9/00* | (2006.01) | |
| *G06K 9/62* | (2006.01) | |
| *G06N 3/08* | (2006.01) | |
| *G06N 3/04* | (2006.01) | |

(52) U.S. Cl.
CPC ......... *G06K 9/6271* (2013.01); *G06K 9/6253* (2013.01); *G06K 9/6257* (2013.01); *G06K 9/6262* (2013.01); *G06N 3/04* (2013.01); *G06N 3/084* (2013.01)

(58) Field of Classification Search
CPC .... G06N 3/0454; G06N 3/084; G06N 3/0472; G06N 3/08; G06N 3/04; G06N 20/00; G06K 9/6267; G06K 9/00288; G06K 9/00496; G06K 9/46; G06K 9/6218
See application file for complete search history.

(56) References Cited

U.S. PATENT DOCUMENTS

| | | | | |
|---|---|---|---|---|
| 9,031,331 | B2* | 5/2015 | Mensink | G06K 9/6272 |
| | | | | 382/159 |
| 10,489,792 | B2* | 11/2019 | Hackman | G06N 3/084 |
| 2014/0376804 | A1* | 12/2014 | Akata | G06K 9/4676 |
| | | | | 382/159 |
| 2018/0165554 | A1* | 6/2018 | Zhang | G06K 9/6269 |

(Continued)

OTHER PUBLICATIONS

Snell, Jake, Kevin Swersky, and Richard Zemel. "Prototypical networks for few-shot learning." Advances in neural information processing systems. 2017. (Year: 2017).*

(Continued)

*Primary Examiner* — Li Liu
(74) *Attorney, Agent, or Firm* — Nicholson De Vos Webster & Elliott, LLP

(57) ABSTRACT

Techniques for training an embedding using a limited training set are described. In some examples, the embedding is trained by generating a plurality of vectors from a random sample of the limited set of training data classes using a layer of the particular machine learning classification model, randomly selecting samples from the plurality of vectors into a set of samples, computing at least one distance for each sampled class from a center parameter for the class using the set of samples, generating a discrete probability distribution over the classes for a query point based on distances to a center parameter for each of the classes in the embedding space, calculating a loss value for the modified prototypical network, the calculation of the loss value being for a fixed geometry of the embedding space and including a measure of the difference between distributions, and back propagating.

20 Claims, 16 Drawing Sheets

(56) References Cited

U.S. PATENT DOCUMENTS

| | | |
|---|---|---|
| 2018/0341862 A1* | 11/2018 | Ehrman .............. G06N 3/0427 |
| 2019/0012526 A1* | 1/2019 | Guo .................... G06K 9/6256 |
| 2019/0034798 A1* | 1/2019 | Yu ......................... G06N 3/063 |
| 2019/0251952 A1* | 8/2019 | Arik ....................... G10L 13/08 |
| 2019/0311814 A1* | 10/2019 | Kannan ................. G16H 80/00 |
| 2020/0090043 A1* | 3/2020 | Mnih .................. G06N 3/0454 |

OTHER PUBLICATIONS

Sung, Flood, et al. "Learning to compare: Relation network for few-shot learning." Proceedings of the IEEE Conference on Computer Vision and Pattern Recognition. 2018. (Year: 2018).*

Garcia, Victor, and Joan Bruna. "Few-shot learning with graph neural networks." arXiv preprint arXiv:1711.04043 (2017). (Year: 2017).*

Ren, Mengye, et al. "Meta-learning for semi-supervised few-shot classification." arXiv preprint arXiv:1803.00676 (2018). (Year: 2018).*

Hilliard, Nathan, et al. "Few-shot learning with metric-agnostic conditional embeddings." arXiv preprint arXiv:1802.04376 (2018). ( Year: 2018).*

* cited by examiner

Training episode loss computation for prototypical networks. $N$ is the number of examples in the training set, $K$ is the number of classes in the training set, $N_C \leq K$ is the number of classes per episode, $N_S$ is the number of support examples per class, $N_Q$ is the number of query examples per class. RANDOMSAMPLE$(S, N)$ denotes a set of $N$ elements chosen uniformly at random from set $S$, without replacement.

Input: Training set $D = \{(x_1, y_1), ..., (x_N, y_N)\}$, where each $y_i \in \{1, ..., K\}$. $D_k$ denotes the subset of $D$ containing all elements $(x_i, y_i)$ such that $y_i = k$.
Output: The loss $J$ for a randomly generated training episode.

$V \leftarrow$ RANDOMSAMPLE$(\{1, ..., K\}, N_C)$  ▷ Select class indices for episode
for $k$ in $\{1, ..., N_C\}$ do
$\quad S_k \leftarrow$ RANDOMSAMPLE$(D_{V_k}, N_S)$  ▷ Select support examples
$\quad Q_k \leftarrow$ RANDOMSAMPLE$(D_{V_k} \setminus S_k, N_Q)$  ▷ Select query examples
$\quad c_k \leftarrow \dfrac{1}{N_C} \sum_{(x_i, y_i) \in S_k} f_\phi(x_i)$  ▷ Compute prototype from support examples
end for
$J \leftarrow 0$  ▷ Initialize loss
for $k$ in $\{1, ..., N_C\}$ do
$\quad$ for $(x, y)$ in $Q_k$ do
$\quad\quad J \leftarrow J + \dfrac{1}{N_C N_Q} \left[ d(f_\phi(x), c_k)) + \log \sum_{k'} \exp(-d(f_\phi(x), c_{k'})) \right]$  ▷ Update loss
$\quad$ end for
end for

*FIG. 2*

PROTOTYPICAL NETWORK ALGORITHMS FOR FEW-SHOT LEARNING

BACKGROUND

Deep learning has enabled successful training of classifiers with impressive performance when a large amount of labelled data is provided. Unfortunately, when there are classes of interest that have only a few examples, successfully training such classifiers using existing techniques is not feasible.

BRIEF DESCRIPTION OF DRAWINGS

Various embodiments in accordance with the present disclosure will be described with reference to the drawings, in which:

FIG. 2 illustrates examples of updating a loss function in a prototypical network algorithm according to some embodiments.

DETAILED DESCRIPTION

Various embodiments of methods, apparatus, systems, and non-transitory computer-readable storage media for training networks using a small amount of data are described. According to some embodiments, a modified prototypical network algorithm is used to train an existing network using a small amount of labeled data.

In some instances, there is an interest in visually classifying classes of interests; be it different type of faucets or different type of cartoon characters. A standard paradigm has been to use a network learned using a fixed set of classes and transferring the features to different learning problems where the data is not sufficient. This is termed as a "few-shot"/"low-shot". Recently, algorithms have started to develop that address this scenario. One such algorithm is called prototypical networks for few-shot learning. In traditional prototypical networks it is assumed that there is an embedding in which points cluster around a single "prototype" representation for each class. An embedding is a representation of input data as a point in space of a given dimension. This prototype is a mean of embedded support samples for each class. Classification is performed for an embedded query point by finding the nearest class prototype to that point. While this algorithm is meant for the few-shot learning scenario, most experiments have been done on small scale data sets. Unfortunately, when this algorithm is utilized on large scale datasets there is as an embedding collapse and all the images are classified as having very similar features.

Figure 1:
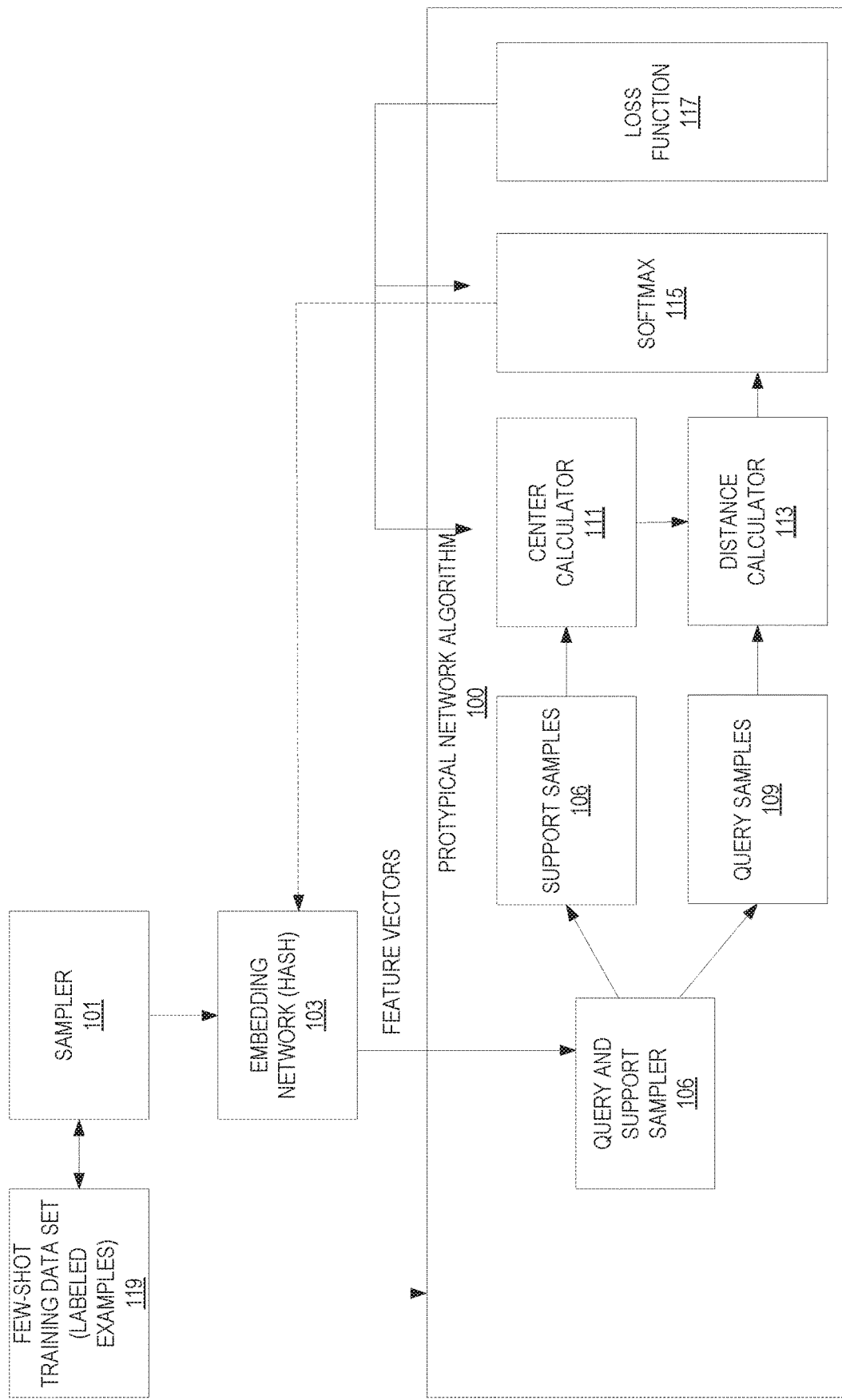
FIG. 1 illustrates examples of a typical prototypical network algorithm and its use to train a model according to some embodiments.

FIG. 1 illustrates examples of a typical prototypical network algorithm and its use to train a model according to some embodiments. In this example of a prototypical network algorithm, there is a small support set of N labeled examples $S=\{(x_1, y_1), \ldots, (x_N, y_N)\}$ to be used, where each $x_i \in \mathbb{R}^D$ is the D-dimensional feature vector of an example and $y_i \in \{1, \ldots, K\}$ is the corresponding label. $S_k$ denotes the set of examples labeled with class k.

Prototypical networks compute an M-dimensional representation $c_k \in \mathbb{R}^M$, or a prototype, of each class through an embedding function $f_\varnothing : \mathbb{R}^D \to \mathbb{R}^M$ with learnable parameters $\varnothing$. In this example, the embedding function is provided by the embedding network. Each prototype is the mean vector of the embedded support points belonging to its class:

$$c_k = \frac{1}{|S_k|} \sum_{(x_1, y_1) \in S_k} f_\varnothing(x_i)$$

Given a distance function $d: \mathbb{R}^M \times \mathbb{R}^M \to [0, +\infty)$, prototypical networks produce a distribution over classes for a query point x based on a softmax over distances to the prototypes in the embedding space:

$$p_\varnothing(y = k | x) = \frac{\exp(-d(f_\varnothing(x), c_k))}{\sum_{k'} \exp(-d((f_\varnothing(x), c_{k'}))}$$

An initial loss for the distribution is found as follows:

$$J_{(\varnothing)} = \log p_\varnothing(y=k|x)$$

Other than the data set 119, the components shown are software modules to be stored in memory and executed by a processor.

As shown, a sampler 101 randomly samples a number of classes ($N_C$) from the few-shot training data set (labeled examples) 119 having N samples. For example, the sampler 101 may sample from a plurality of image classes (such as a variety of animal types) and only take N samples from each of these classes.

An embedding network 103 (any network architecture such as convolutional neural networks (CNNs), deep neural networks (DNNs), recurrent neural networks (RNNs), a fully connected network, or a combination thereof, etc.) takes the samples and generates a feature vector per sample. In particular, an output of a layer (such as a hidden layer) of the embedding network 103 is used as a feature vector. Note that the embedding network 103 is an image classifier in some embodiments.

The feature vectors are then input into the prototypical network algorithm 100. In particular, the feature vectors are subjected to a query and support sampler 105 which randomly picks a first set of vectors to use as support samples 106 and a second, different set of vectors to use as query point samples 107 from each sampled class.

The support samples are utilized to calculate a "center" using a center calculator 111 per class. In the typical prototypical network algorithm, the center calculation is the prototype detailed above, which is a mean vector of the embedded support points belonging to its class as defined above.

The centers and query samples 109 are fed into a distance calculator 113 which calculates distances for each class. In some embodiments, the distances are squared Euclidean distances. In other embodiments, Mahalanobis distances are calculated.

The calculated distances are then used to generate a distribution for a query point over the classes based on a softmax over distances between the embeddings and the prototypes using a softmax function 115 as shown below. In some embodiments, this distribution is fed back to the embedding network 103 for use as a layer. In other embodiments, this distribution is the "output" of the embedding network 103 for a requested classification.

$$p_\phi(y=k \mid x) = \frac{\exp(-d(f_\phi(x), c_k))}{\sum_{k'} \exp(-d(f_\phi(x), c_{k'}))}$$

Additionally, a loss function 117 is updated according to the method shown in FIG. 2 and the loss function (or a derivative thereof) is fed back into the embedding network 103 to train it. In particular, it is this loss function calculation that is to be improved in some embodiments.

Detailed herein are embodiments of systems methods, apparatus, systems, and non-transitory computer-readable storage media that improve upon the prototypical networks algorithm for few-shot learning approach. In particular, in some embodiments one or more changes to the loss function are made: 1) adding an entropy term (the addition of an entropy term better promotes separation between points and prevents the embedding collapse); 2) using a fixed geometry (adding the entropy may cause the points to diverge more and more and the fixed geometry constrains the embedding space); and/or 3) train using a fixed anchor point instead of a mean of the points of the class (this should help converge faster).

Figure 3:
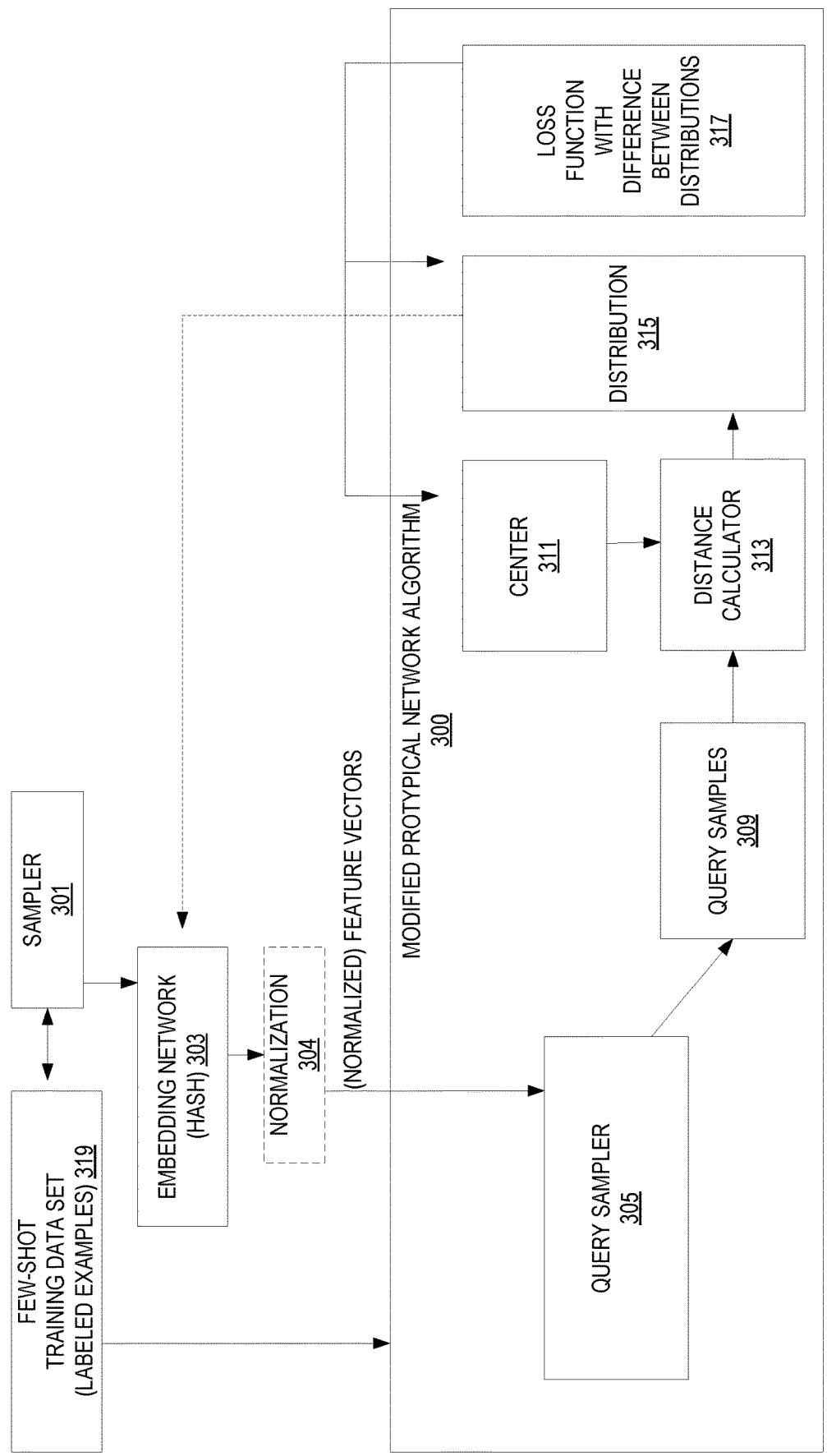
FIG. 3 illustrates examples of a modified prototypical network algorithm and its use to train a model according to some embodiments.

FIG. 3 illustrates examples of a modified prototypical network algorithm and its use to train a model according to some embodiments. As noted above, a prototypical network algorithm takes in an input and maps it to a dimensional feature vector called the embedding. Another way to express this is a prototypical network $\emptyset_w:X \rightarrow Z$; $x \rightarrow \emptyset_w(x)=z$ takes as input x and maps it to a n dimensional feature. Assume that the $i^{th}$ point $x_k^i$ belongs to class k and each class has the same number of points. The posterior probability of the data belonging to a class j can be written as:

$$p_w(y' = j \mid z_k^i) = \frac{e^{-d(z_k^i, c_j)}}{\sum_l e^{-d(z_k^i, c_l)}} = \frac{e^{-d(z_k^i, c_j)}}{S}$$

where $S = \sum_l e^{-d(z_k^i, c_l)}$. Based on this formation of the posterior probability and using a standard cross entropy loss as the loss function, the prototypical loss is:

$$L(x,k) = -\log P_w(y' = k \mid x).$$

Again, it is this loss function of a traditional prototypical network algorithm, and its impact on the embedding used in the prototypical network algorithm, that embodiments detailed herein address.

Other than the data set 319, the components shown are software modules to be stored in memory and executed by a processor. As shown, a sampler 301 randomly samples a number of classes from the few-shot training data set (labeled examples) 319 having N samples. For example, the sampler 301 may sample from a plurality of image classes (such as a variety of animal types) and only take N samples from each of these classes.

An embedding network 303 (any network architecture such as convolutional neural networks (CNNs), deep neural networks (DNNs), recurrent neural networks (RNNs), a fully connected network, or a combination thereof, etc.) takes the samples of the labeled examples 319 and generates a feature vector per sample. In particular, an output of a layer (such as a hidden layer) of the embedding network 303 is used as a feature vector. Note that the embedding network 303 is an image classifier in some embodiments. In some embodiments, the feature vectors are subjected to a normalization function 304 prior to being fed into the modified prototypical network algorithm 300.

The feature vectors are input into the prototypical network algorithm 300. In particular, the feature vectors are subjected to a query sampler 305 which randomly picks a set of feature vectors to use as query point samples 309 from each sampled class.

In some embodiments, one or more center values 311 is provided as a parameter of the modified prototypical network algorithm 300. For example, a center value per class may be initially provided and then updated as a stored variable that is updated.

The one or more centers 311 and query samples 309 are fed into a distance calculator 313 which calculates distances for each sampled class. The distances being calculated, per class, from the center variable for the class to the query samples 309 for that class. In some embodiments, the distances are squared Euclidean distances. In other embodiments, Mahalanobis distances are calculated.

The calculated distances are then used to generate a discrete probability distribution over the classes for a query point based on distances to center parameter for that class in the embedding space. In some embodiments, this is performed by mapping of the distances to a point on a standard simplex. For example, in some embodiments, the distribution (classification) for a query point over the classes is generated as a softmax over distances between a plurality of vectors and the center calculations in the embedding space using a distribution calculator 315 wherein softmax is the normalization function. In some embodiments, this distribution is fed back to the embedding network 303 and used as a layer (hidden or output). In other embodiments, this distribution is the "output" of the embedding network 303 for a requested classification.

A loss function 317 and its derivative are calculated and the loss function (or the derivative thereof) is fed back into the center calculator 311 which adjusts the center variables and distribution calculator 315 to train the embedding (adjust weights). This loss function 317 includes a measure of the difference between distributions (such as an entropy component (shown as a summation below).

$$\mathcal{L}(x, k) = -\log P_w(y' = k \mid x) - \sum_{l=1}^{K} P_w(y' = l \mid x) \log P_w(y' = l \mid x)$$

Additionally, in some embodiments, the limited geometry of the embedding space is limited to shape such as a sphere or other ellipsoid.

Figure 4:
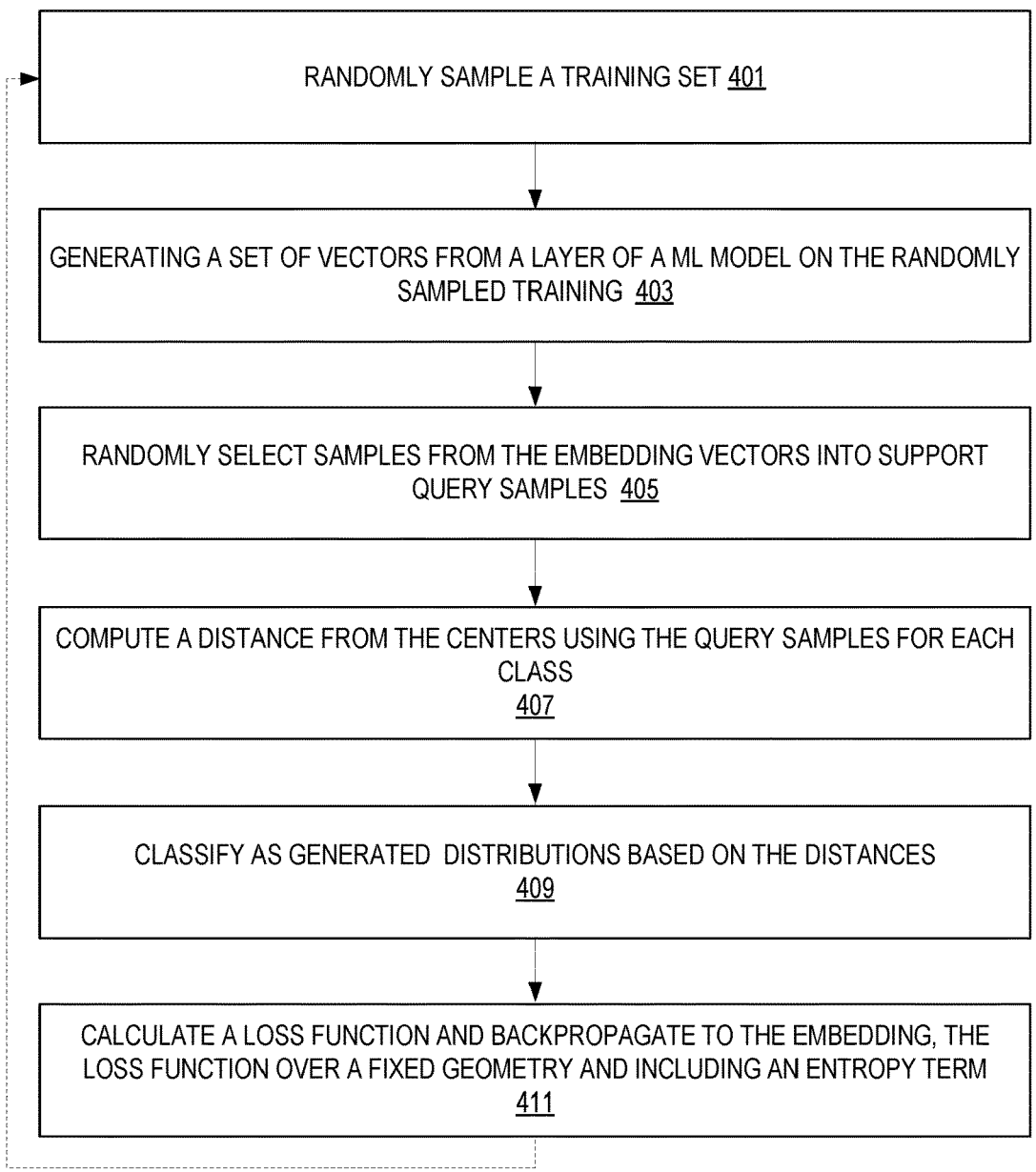
FIG. 4 illustrates examples of a method of utilizing a modified prototypical network algorithm to train a model according to some embodiments.

FIG. 4 illustrates examples of a method of utilizing a modified prototypical network algorithm to train an embedding to be used by a model according to some embodiments. A number of classes from a few-shot training data set (labeled examples) having N samples is randomly sampled at 401. In some embodiments, the sampler 301 performs this operation.

An embedding of the samples of the labeled examples is performed by an embedding network (any network architecture such as convolutional neural networks (CNNs), deep neural networks (DNNs), recurrent neural networks (RNNs), etc.) to generate feature vectors at 403. In some embodiments, the generated feature vectors are also normalized.

The generated (normalized) feature vectors are input into a modified prototypical network algorithm which randomly picks a set of feature vectors to use as query point samples from each sampled class at 405. For example, the feature vectors are subjected to a query and support sampler 305 in some embodiments.

A distance calculation for the center variables and query samples is performed at 407. The distances being calculated, per class, from the center variable for the class to the query samples 309 for that class. For example, in some embodiments, the distance calculator 313 calculates distances for each sampled class. In some embodiments, the distances are squared Euclidean distances. In other embodiments, Mahalanobis distances are calculated.

The calculated distances are then used to generate a distribution by mapping of the distances to a point on a standard simplex, applying normalization to obtain non-negative values that add to one, or a mix of applying normalization to obtain a point on a standard simplex at 409. This distribution is a classification. In some embodiments, the normalization is a softmax function.

A loss and its derivative are calculated using the loss function 317 and one or both are fed back to the center calculator 311 and/or distribution calculator 315 to train the embedding (adjust weights) at 411. This loss function includes an entropy component. In some embodiments, the loss function is boundary restricted and/or does not include utilize a mean vector of the embedded support points belonging to its class.

In some embodiments, the activities of 401 to 411 are repeated.

Figure 5:
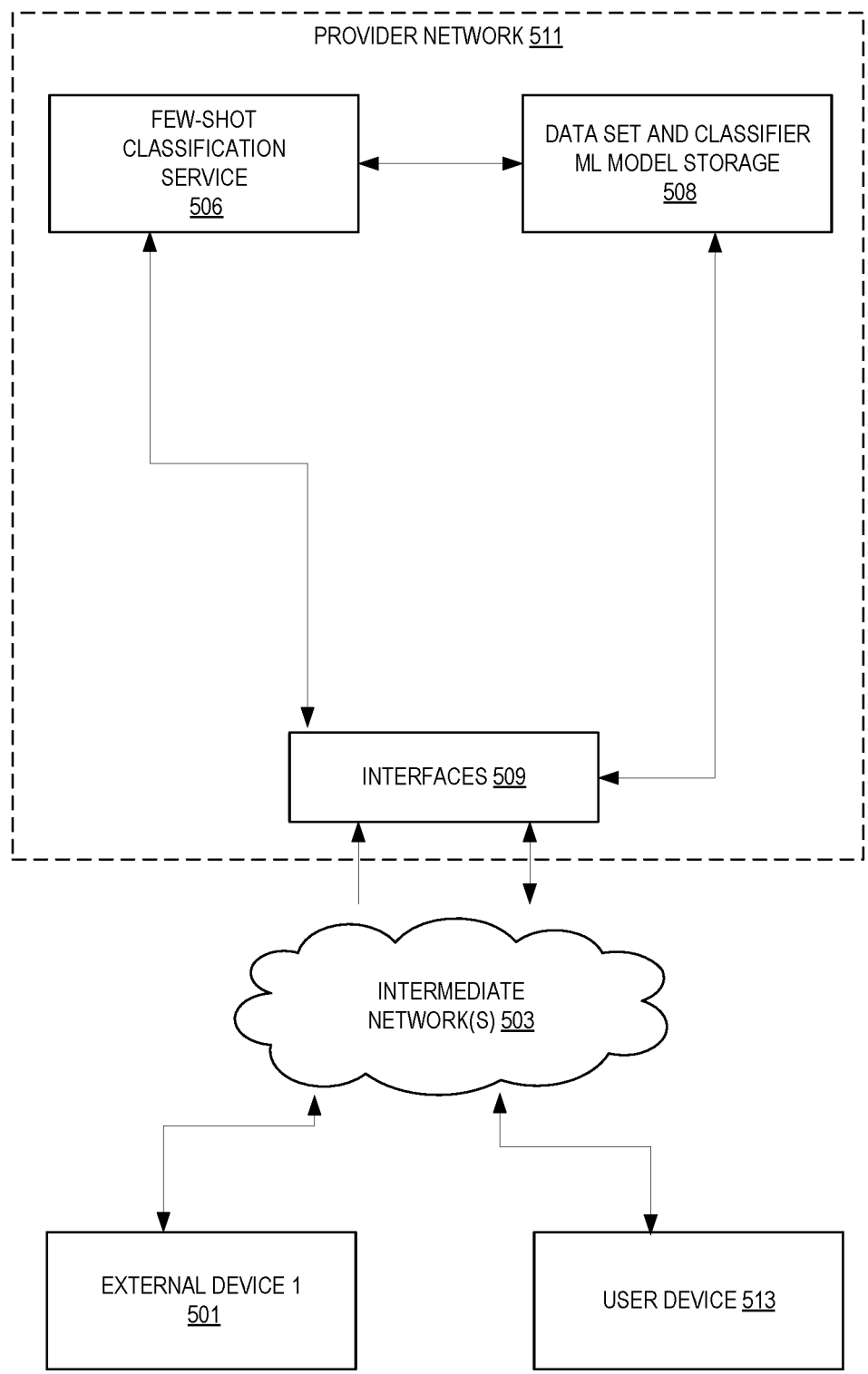
FIG. 5 illustrates embodiments of a system for performing NLU operations including inference.

FIG. 5 illustrates embodiments of a system for performing NLU operations including inference. As shown, in some embodiments, a provider network 511 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least hosting a few-shot classification service 506. These and other computing resources may be provided as services, such as a hardware virtualization service that can execute compute instances, a storage service that can store data objects, etc. The users (which may or may not be customers who have a particular financial relationship with a service provider) of provider networks 511 may utilize one or more user accounts that are associated with a customer account, though these terms may be used somewhat interchangeably depending upon the context of use. User and/or administrative devices 501, 513 may interact with a provider network 511 across one or more intermediate networks 503 (e.g., the internet) via one or more interface(s) 509, such as through use of application programming interface (API) calls, via a console implemented as a website or application, etc. The interface(s) 509 may be part of, or serve as a front-end to, a control plane of the provider network 511 that includes "backend" services supporting and enabling the services that may be more directly offered to customers. Note that in some embodiments a provider network 511 is not utilized for hosting the few-shot classification service 506 and the aspects of this service are software components of one or more standalone devices.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In this illustration, the provider network 511 provides ML services including, but not limited to, few-shot classification and/or ML inference services such as inference for a ML classifier model. As shown, an external device 501 communicates with the provider network 511 via intermediate networks 503 and interfaces 509. In particular, external device 501 communicates with the few-shot classification service 506 (and/or the data set and classifier ML model storage 508). The few-shot classification service 506 is configured by a user of the external device 501. Examples of configuring include telling the few-shot classification service 506 what stored data set and ML model 508 to use for few-shot classification, where to store any results of the training of the ML model 508, etc. The few-shot classification service 506 utilizes a modified prototypical network algorithm to train a selected ML model using an identified data set. The provider network 511 may also host the trained ML model. A user device 513 can then generate a request for a classification (inference) using the model.

Figure 6:
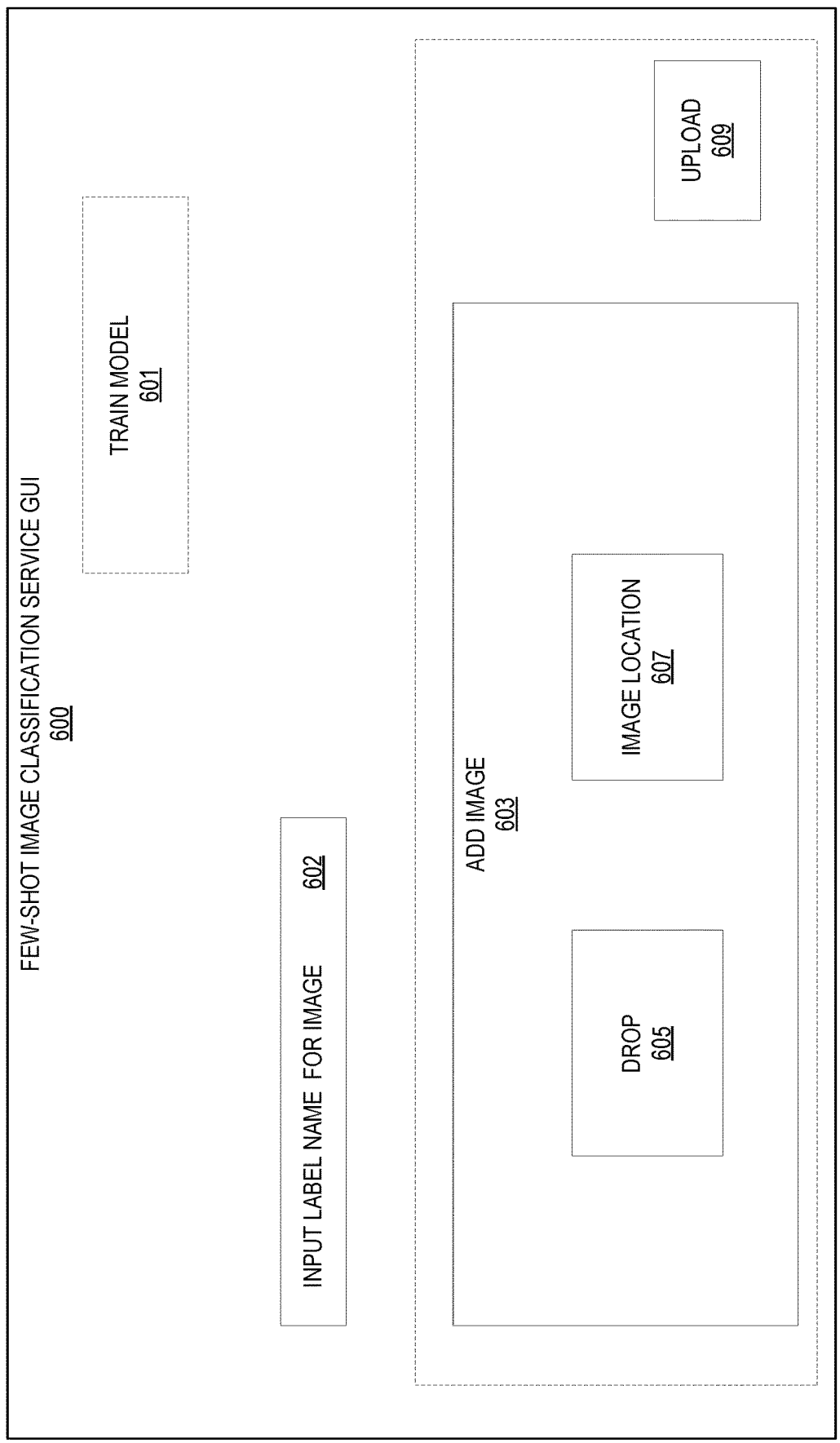
FIG. 6 illustrates embodiments of a few-shot image classification service graphical user interface (GUI).

FIG. 6 illustrates embodiments of a few-shot image classification service graphical user interface (GUI). In particular, this is a part of an overall GUI that allows a user to upload and classify images and/or train a model of his/her choosing with a small (on a relative scale) data set images. While this description is geared toward image classification, the GUI may be modified to fit the needs of other classifications (such as video, audio, etc.). In some implementations, the user interacts with this service (such as the few-shot classification service 506) via intermediate networks and interfaces such as those detailed herein.

In this illustration, GUI 600 allows the user to request several different types of actions be performed by the few-shot image classification service. In particular, through this interface, a user may upload one or more images through an add image block 603 and then provide a label for the one or more images using an input box 602. Images may be added using a drop box 605 and/or by providing an image location 607 for the image (such as a URL or a pointer to a location in storage of a provider network). Once an image is "added," in some embodiments, the user uploads the image via an upload button 609. In other embodiments, the upload occurs automatically. In this GUI, the user may also cause a training of the model via a request using train model input box 601.

Figure 7:
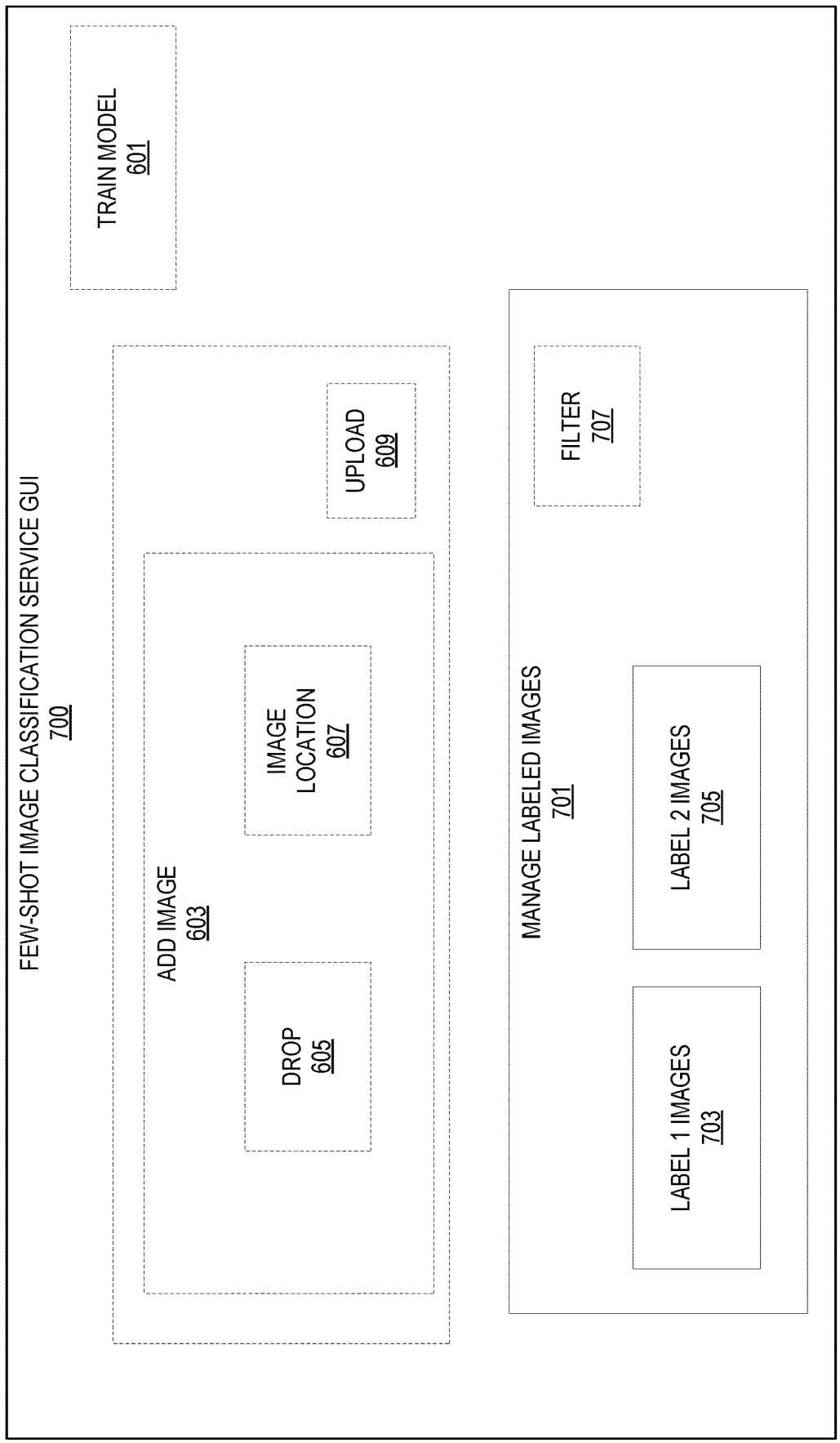
FIG. 7 illustrates embodiments of a few-shot image classification service graphical user interface (GUI).

FIG. 7 illustrates embodiments of a few-shot image classification service graphical user interface (GUI). In particular, this is a part of an overall GUI that allows a user to add images, manage labeled images, and/or to train a model of his/her choosing with a small (on a relative scale) data set images. While this description is geared toward image classification, the GUI may be modified to fit the needs of other classifications (such as video, audio, etc.). In some implementations, the user interacts with this service (such as the few-shot classification service 506) via intermediate networks and interfaces such as those detailed herein.

In this illustration, GUI 700 allows the user to request several different types of actions be performed by the few-shot image classification service. In particular, through this interface, in some embodiments, a user may upload one or more images through an add image block 603 and then provide a label for that image using an input box 602. Images may be added by a drop box 605 and/or by providing an image location 607 for the image (such as a URL or a pointer to a location in storage of a provider network). Once an image is "added," in some embodiments, the user uploads via an upload button 609. In other embodiments, the upload is automatic. In this GUI, the user may also cause a training of the model via a request using train model input box 601.

GUI 701 provides a mechanism for managing existing labeled images through a manage labeled images interface 701. As illustrated, the user is presented with an indication of images that are labeled in a certain manner. For example, images that have label 1 703 and images that have label 2 705. This indication may be the images themselves with a corresponding visual indication (such as overlaid text, text near the images, etc.) or the indication may be of a folder with text indicating its labeled contents. The labeled images may also be filtered using a filer 707 and presented as a filtered list, etc.

Figure 8:
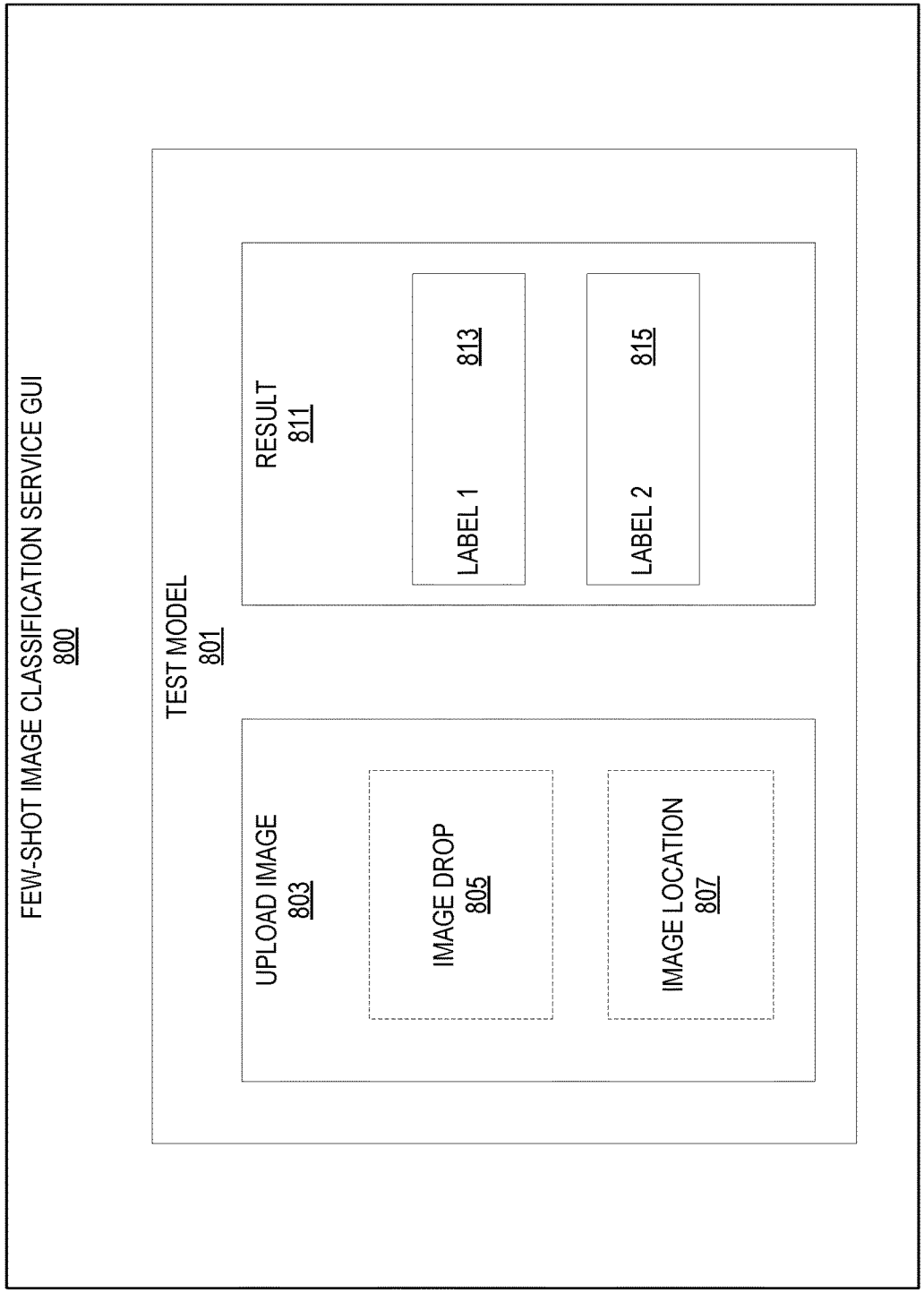
FIG. 8 illustrates embodiments of a few-shot image classification service graphical user interface (GUI).

FIG. 8 illustrates embodiments of a few-shot image classification service graphical user interface (GUI). In particular, this is a part of an overall GUI that allows a user to add images, manage labeled images, and/or to train a model of his/her choosing with a small (on a relative scale) data set images. While this description is geared toward image classification, the GUI may be modified to fit the needs of other classifications (such as video, audio, etc.). In some implementations, the user interacts with this service (such as the few-shot classification service 506) via intermediate networks and interfaces such as those detailed herein.

In this illustration, GUI 800 allows the user to request several different types of actions be performed by the few-shot image classification service. In particular, through this interface, which includes a testing model block 801, in some embodiments, a user may upload one or more images through an upload image block 803 and then test the uploaded image. Images may be uploaded by a drop box 805 and/or by providing an image location 807 for the image (such as a URL or a pointer to a location in storage of a provider network). Training of the model is automatic from this interface in most embodiments.

A result 811 of the testing of the model for the uploaded image is presented. This result gives an indication of how the uploaded image trends toward the various known labels (here shown as indications for label 1 813 and label 2 815). This trend may be a raw value, a percentage, etc.

Figure 9:
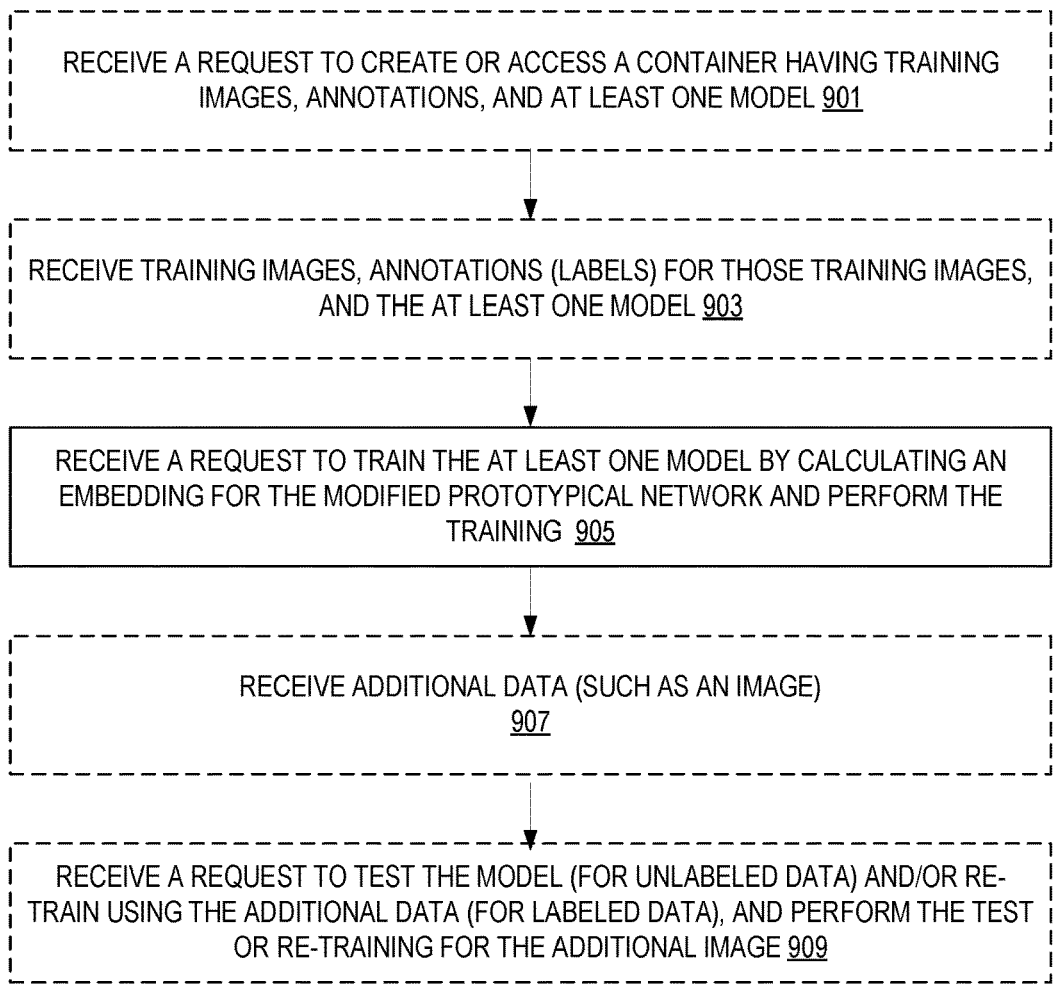
FIG. 9 illustrates examples of a method of utilizing a modified prototypical network algorithm to train a model according to some embodiments.

FIG. 9 illustrates examples of a method of utilizing a modified prototypical network algorithm to train a model according to some embodiments. In some embodiments, the model is an image classifier. Additionally, in some embodiments, the trained model is used to classify received data (such as an image) although this is described with respect to FIG. 10. Depending upon the implementation, aspects of this method are performed in a provider network, on an edge device, or a combination of these.

At 901, in some embodiments, a request is received to create or access a container having training data, annotations (labels) for that training data, and at least one machine learning model. When a provider network is utilized, this request is received via intermediate networks and interfaces and the request may include a request to utilize the classification service. When the modified provider network is on a standalone device, this request is received via a client input scheme (such as keyboard and mouse). To create a container, the request may include one or more of: a name of the container, training data, labels for the training data, one or more models to train, etc. Note that a container may be a structure that houses the training data, etc., or may be a logical structure that references one or more storage locations of these items. To access a container, the request may include one or more of a name of the container and/or a location of the container (and its contents if needed).

One or more training images, annotations for those images, and at least one model to train are received in some embodiments at 903. In some embodiments, this is performed by accessing a container. For example, using a provider network service, the classification service receives this information from, for example, network storage and/or as a part of the request. On a standalone device, these items are retrieved from storage.

At 905, a request to train the at least one model is received and the at least one model to train is "trained." The request indicates that the model is to be trained by calculating an embedding used in a modified prototypical network algorithm as detailed above. FIG. 4 illustrates examples of embodiments of this training. This embedding may replace a layer in the identified model (such an output layer or a hidden layer that feeds an output layer) or be an output for the model. For example, using a provider network service, the classification service receives this request and performs the training.

In some embodiments, new data is received at 907. For example, a new image is received by the classification service. The new data may be labeled data (to be used to re-train) or unlabeled data (to be used to test the trained at least one model).

At 909, a request to re-train the at least one model or test the at least one model based on the new data is received and the re-training or testing is performed in some embodiments. Testing involves putting the new data through the model trained using the modified prototypical network algorithm and/or through the prototypical network algorithm to generate a label. Re-training involves utilizing the labeled data as a part of the training data set and retraining the embedding as detailed. In this instance, unlike the embodiments of FIG. 4, for example, the data will be included in what is to pass through the modified prototypical network algorithm (in other words, at least one feature vector will not be randomly chosen).

Figure 10:
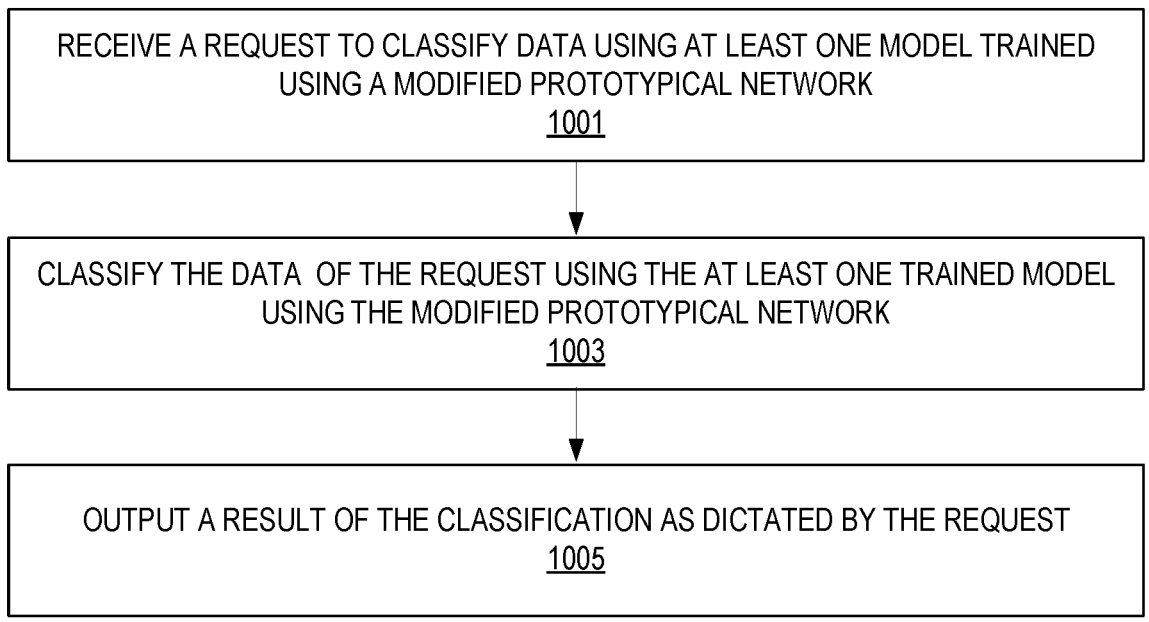
FIG. 10 illustrates examples of a method of utilizing a model trained using a modified prototypical network algorithm according to some embodiments.

At some point in time, after the at least one model has been "trained," it will be deployed or otherwise made available for use. FIG. 10 illustrates examples of a method of utilizing a model using a trained embedding of a modified prototypical network algorithm according to some embodiments. Additionally, in some embodiments, the model is an image classifier and the trained model is used to classify a received image. Depending upon the implementation, aspects of this method are performed in a provider network, on an edge device, or a combination of these.

At 1001, a request to classify data using at least one trained model using an embedding of a modified prototypical network algorithm is received. The request indicates what model(s) to use, how to provide a result or results of the classification, and either the data itself or an indication of where the data is (such as a URL). For example, using a provider network service, the classification service receives this request.

The data of the request is classified using the requested model at 1003. In some embodiments, this includes accessing the data first. The requested model calls the modified prototypical network algorithm to generate the classification using the embedding.

A result of the classification is output as dictated by the request at 1005.

Figure 11:
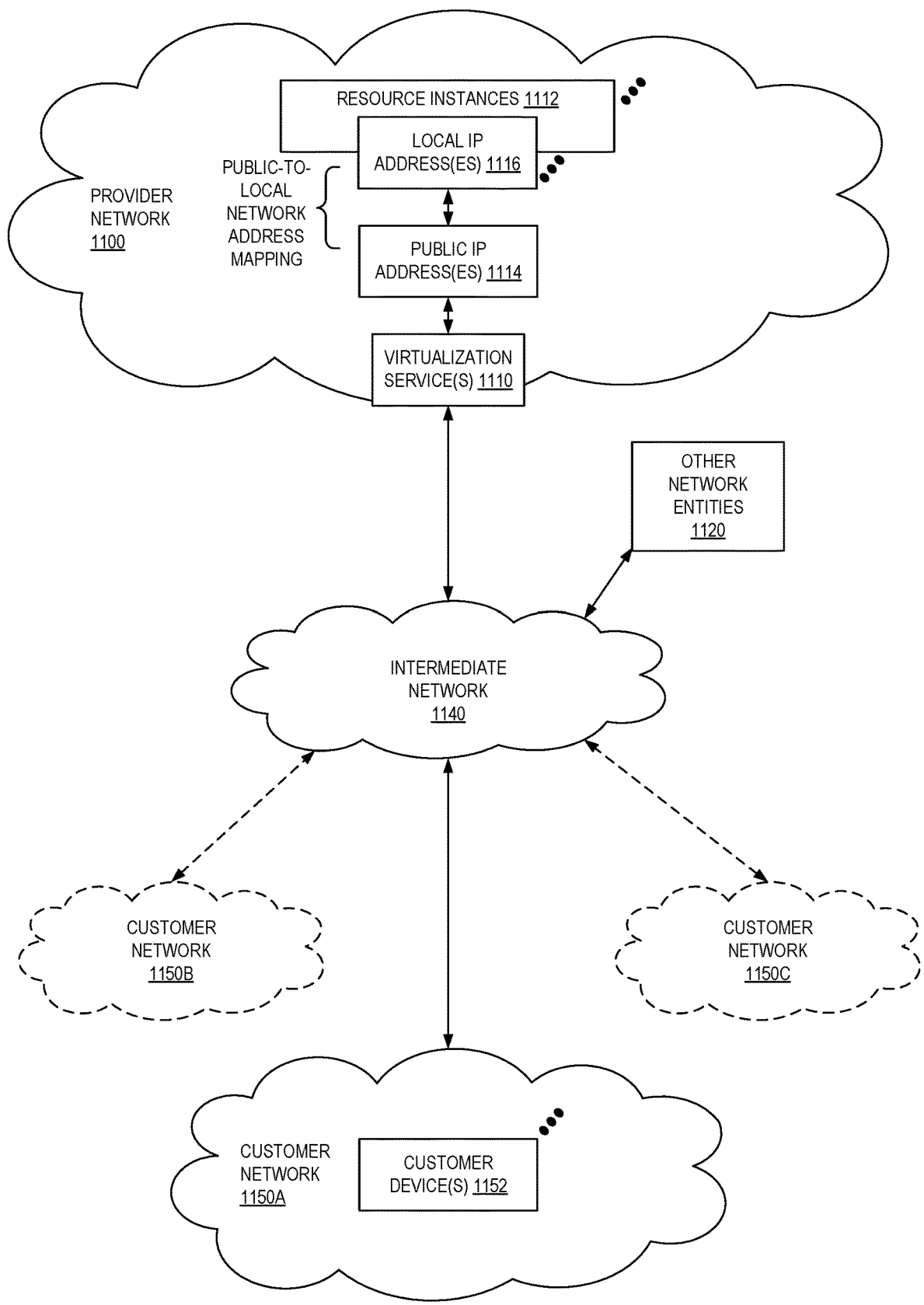
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses.

Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
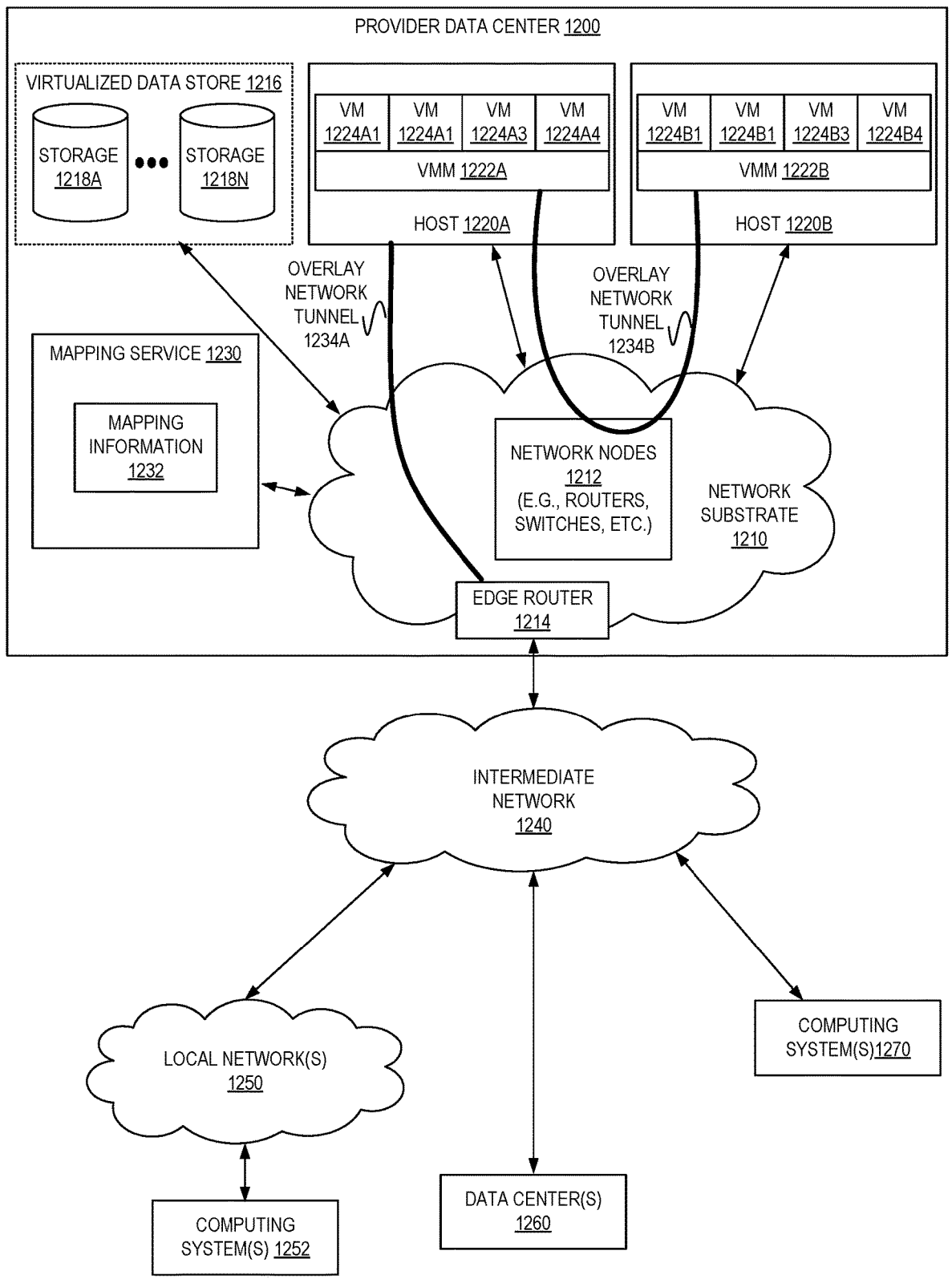
FIG. 12 illustrates an example data center that implements an overlay network on a network substrate using IP tunneling technology according to some embodiments.

FIG. 12 illustrates an example data center that implements an overlay network on a network substrate using IP tunneling technology, according to some embodiments. A provider data center 1200 may include a network substrate that includes networking nodes 1212 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1210 using tunnels. The IP tunneling technology may provide a mapping and encapsulating system for creating an overlay network on a network (e.g., a local network in data center 1200 of FIG. 12) and may provide a separate namespace for the overlay layer (the public IP addresses) and the network substrate 1210 layer (the local IP addresses). Packets in the overlay layer may be checked against a mapping directory (e.g., provided by mapping service 1230) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1230) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 12, an example overlay network tunnel 1234A from a virtual machine (VM) 1224A (of VMs 1224A1-1224A4, via VMM 1222A) on host 1220A to a device on the intermediate network 1240 and an example overlay network tunnel 1234B between a VM 1224A (of VMs 1224A1-1224A4, via VMM 1222A) on host 1220A and a VM 1224B (of VMs 1224B1-1224B4, via VMM 1222B) on host 1220B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 12, at least some networks in which embodiments may be implemented may include hardware virtualization technology that enables multiple operating systems to run concurrently on a host computer (e.g., hosts 1220A and 1220B of FIG. 12), i.e. as virtual machines (VMs) 1224 on the hosts 1220. The VMs 1224 may, for example, be executed in slots on the hosts 1220 that are rented or leased to customers of a network provider. A hypervisor, or virtual machine monitor (VMM) 1222, on a host 1220 presents the VMs 1224 on the host with a virtual platform and monitors the execution of the VMs 1224. Each VM 1224 may be provided with one or more local IP addresses; the VMM 1222 on a host 1220 may be aware of the local IP addresses of the VMs 1224 on the host. A mapping service 1230 may be aware of (e.g., via stored mapping information 1232) network IP prefixes and IP addresses of routers or other devices serving IP addresses on the local network. This includes the IP addresses of the VMMs 1222 serving multiple VMs 1224. The mapping service 1230 may be centralized, for example on a server system, or alternatively may be distributed among two or more server systems or other devices on the network. A network may, for example, use the mapping service technology and IP tunneling technology to, for example, route data packets between VMs 1224 on different hosts 1220 within the data center 1200 network; note that an interior gateway protocol (IGP) may be used to exchange routing information within such a local network.

In addition, a network such as the provider data center 1200 network (which is sometimes referred to as an autonomous system (AS)) may use the mapping service technology, IP tunneling technology, and routing service technology to route packets from the VMs 1224 to Internet destinations, and from Internet sources to the VMs 1224. Note that an external gateway protocol (EGP) or border gateway protocol (BGP) is typically used for Internet routing between sources and destinations on the Internet. FIG. 12 shows an example provider data center 1200 implementing a network that provides resource virtualization technology and that provides full Internet access via edge router(s) 1214 that connect to Internet transit providers, according to some embodiments. The provider data center 1200 may, for example, provide customers the ability to implement virtual computing systems (VMs 1224) via a hardware virtualization service and the ability to implement virtualized data stores 1216 on storage resources 1218A-1218N via a storage service.

The data center 1200 network may implement IP tunneling technology, mapping service technology, and a routing service technology to route traffic to and from virtualized resources, for example to route packets from the VMs 1224 on hosts 1220 in data center 1200 to Internet destinations, and from Internet sources to the VMs 1224. Internet sources and destinations may, for example, include computing systems 1270 connected to the intermediate network 1240 and computing systems 1252 connected to local networks 1250 that connect to the intermediate network 1240 (e.g., via edge router(s) 1214 that connect the network 1250 to Internet transit providers). The provider data center 1200 network may also route packets between resources in data center 1200, for example from a VM 1224 on a host 1220 in data center 1200 to other VMs 1224 on the same host or on other hosts 1220 in data center 1200.

A service provider that provides data center 1200 may also provide additional data center(s) 1260 that include hardware virtualization technology similar to data center 1200 and that may also be connected to intermediate network 1240. Packets may be forwarded from data center 1200 to other data centers 1260, for example from a VM 1224 on a host 1220 in data center 1200 to another VM on another host in another, similar data center 1260, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1218A-1218N, as virtualized resources to customers of a network provider in a similar manner.

Figure 13:
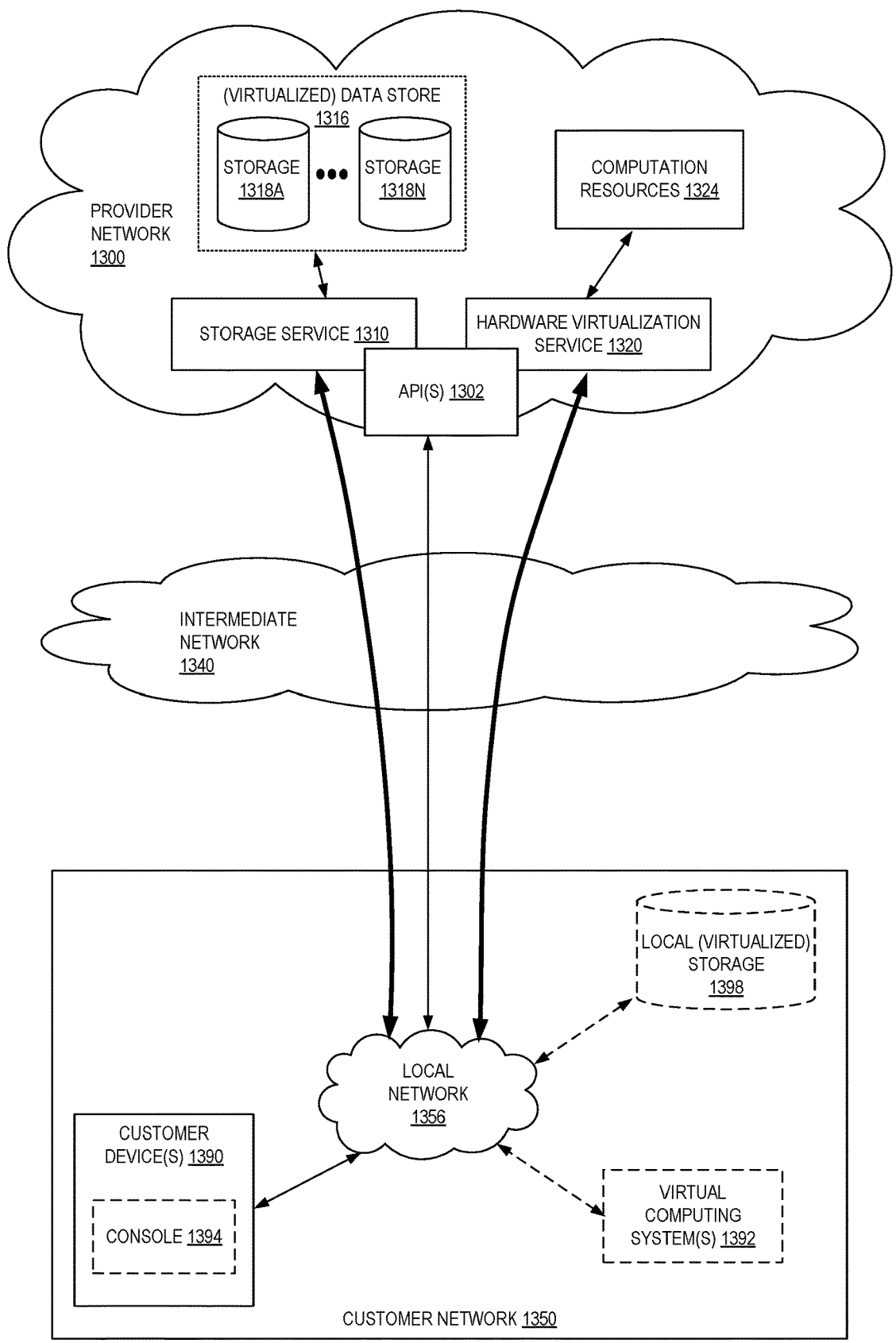
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Figure 14:
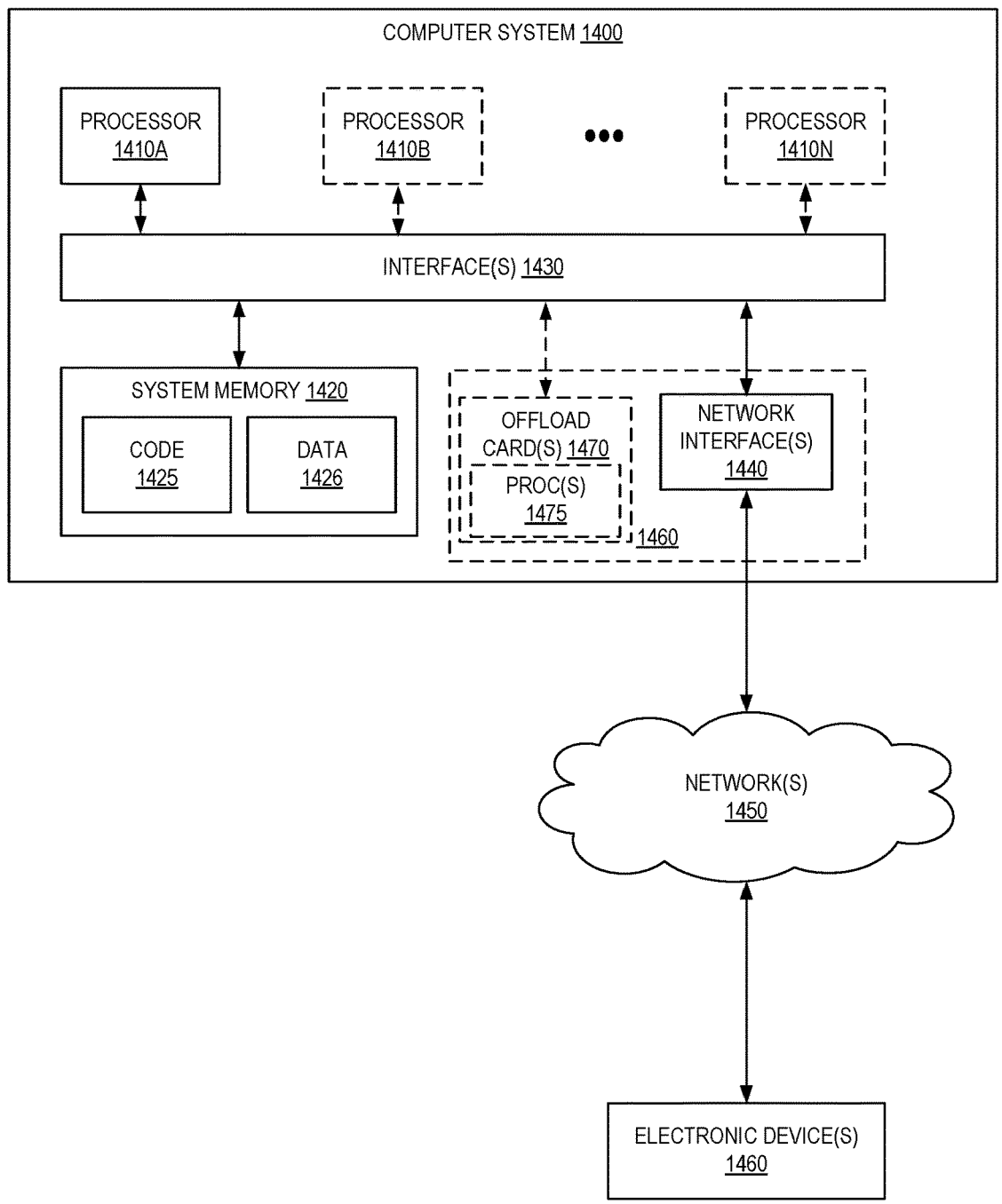
FIG. 14 is a block diagram illustrating an example computer system that may be used in some embodiments.

In some embodiments, a system that implements a portion or all of the techniques for training a model using a modified prototypical network algorithm as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
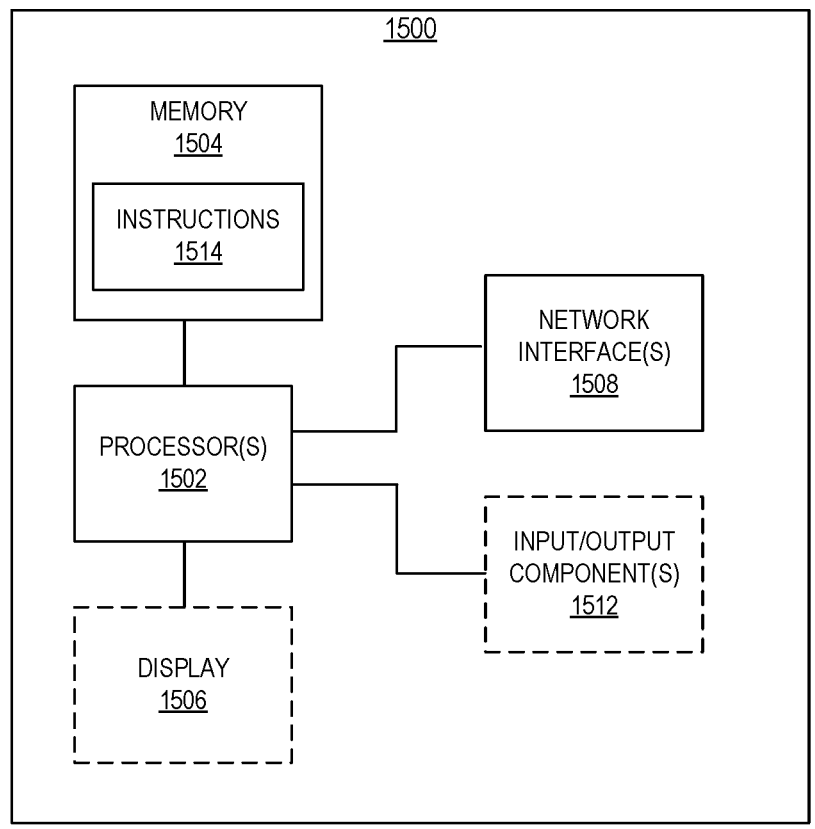
FIG. 15 illustrates a logical arrangement of a set of general components of an exemplary computing device that can be utilized in accordance with various embodiments.

FIG. 15 illustrates a logical arrangement of a set of general components of an example computing device 1500 such as a provider network, etc. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (e.g., instructions 1514) and/or data, and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1514) for execution on the set of one or more processors 1502 of that electronic device. One or more parts of various embodiments may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some embodiments include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 16:
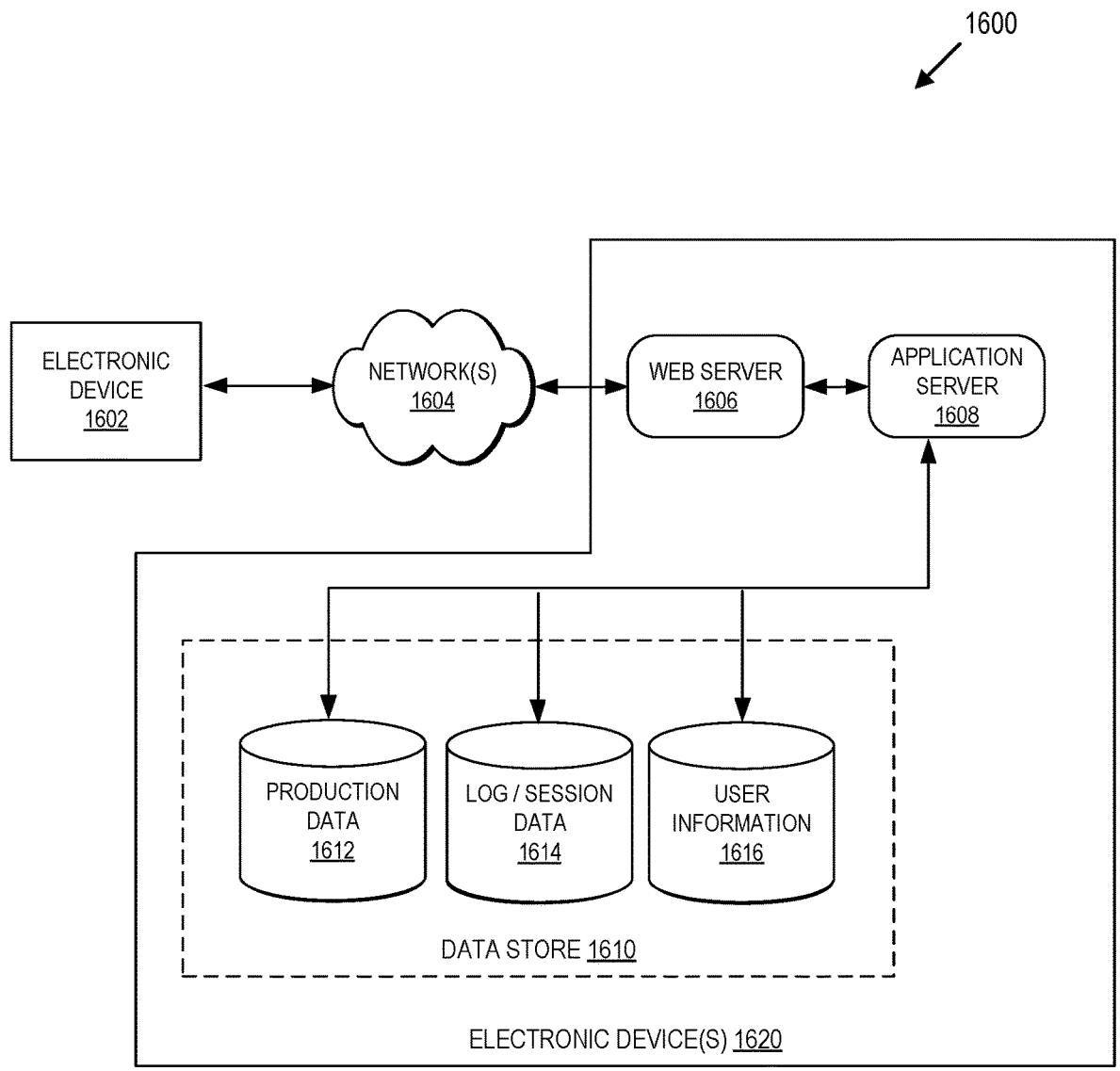
FIG. 16 illustrates an example of an environment for implementing aspects in accordance with various embodiments.

As discussed, different approaches can be implemented in various environments in accordance with the described embodiments. For example, FIG. 16 illustrates an example of an environment 1600 for implementing aspects in accordance with various embodiments. For example, in some embodiments requests are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various embodiments.

The system includes an electronic client device 1602, which may also be referred to as a client device and can be any appropriate device operable to send and receive requests, messages or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving and storing a set of labeled training images having a plurality of classes;
receiving a request to train a particular machine learning image classification model based upon the stored set of labeled training images, the machine learning image classification model having an input layer, one or more hidden layers, and an output layer;
training an embedding that is a representation of input data as a point in space of a given dimension to use with the particular machine learning image classification model using a network including the embedding by:
performing embeddings using a layer of the particular machine learning image classification model to generate a plurality of vectors from a random sample of the labeled training images classes,
randomly selecting samples from the plurality of vectors into a set of samples,
computing at least one distance for each sampled class from a center parameter for the class using the set of samples,
generating a discrete probability distribution over the classes for a query point based on distances to a center parameter for each of the classes in the embedding space,
calculating a loss value for the network, the calculation of the loss value being for a fixed geometry of the embedding space and including a measure of the difference between distributions, and
back propagating at least a derivative of the loss value to the embedding to adjust weights of the embedding;
after training the particular machine learning image classification model using a network, receiving a classification request to classify an image using the trained particular machine learning image classification model using the embedding, the request including an image to classify;
classifying the image using the trained particular machine learning image classification model using the embedding to create a result; and
returning the result according to the classification request.

2. The computer-implemented method of claim 1, wherein the measure of the difference between distributions is an entropy function.

3. The computer-implemented method of claim 1, wherein the distances are squared Euclidean distances and the fixed geometry is a sphere.

4. A computer-implemented method comprising:
receiving a request to train a machine learning classification model based upon a set of labeled training data, the set of labeled training data having a plurality of classes and the machine learning classification model having an input layer, one or more hidden layers, and an output layer;
training an embedding that is a representation of input data as a point in space of a given dimension to use by the machine learning classification model using a network including the embedding by:
generating a plurality of vectors from a random sample of the labeled training data classes using a layer of the particular machine learning classification model,
randomly selecting samples from the plurality of vectors into a set of samples,
computing at least one distance for each sampled class from a center parameter for the class using the set of samples,
generating a discrete probability distribution over the classes for a query point based on distances to a center parameter for each of the classes in the embedding space,
calculating a loss value for the network, the calculation of the loss value being for a fixed geometry of the embedding space and including a measure of the difference between distributions, and
back propagating at least a derivative of the loss value to the embedding to adjust weights of the embedding.

5. The computer-implemented method of claim 4, further comprising:
after training the particular machine learning classification model using the network, receiving a classification request to classify data using the trained particular machine learning classification model, the request including data to classify;
classifying the data using the embedding of the trained particular machine learning classification model to produce a result; and
returning the result according to the classification request.

6. The computer-implemented method of claim 4, further comprising:
after training the particular machine learning classification model using the network, receiving a classification request to classify data using the trained particular machine learning classification model, the request including an identification of location of data to classify;
retrieving the data at the identified location;
classifying the data using the embedding of the trained particular machine learning classification model to produce a result; and
returning the result according to the classification request.

7. The computer-implemented method of claim 4, wherein the measure of the difference between distributions is an entropy function.

8. The computer-implemented method of claim 4, wherein the distances are squared Euclidean distances and the fixed geometry is a sphere.

9. The computer-implemented method of claim 4, wherein the particular machine learning classification model is a neural network.

10. The computer-implemented method of claim 9, wherein the neural network is of a type selected at least from a convolutional neural networks (CNN), deep neural networks (DNN), recurrent neural networks (RNNs), fully connected network, or combination thereof.

11. The computer-implemented method of claim 4, wherein the particular machine learning classification model is an image classification model.

12. The computer-implemented method of claim 4, wherein a service of a provider network performs the training of the particular machine learning classification model.

13. The computer-implemented method of claim 12, wherein the service of the provider network provides a graphical user interface to manage the set of labeled training data.

14. A provider network comprising:
a particular machine learning classification model implemented using a first one or more electronic devices; and
a classification service implemented by a second one or more electronic devices, the classification service including instructions that upon execution cause the classification service to:
train an embedding that is a representation of input data as a point in space of a given dimension to use by the particular machine learning classification model using a network including the embedding by:
generating a plurality of vectors from a random sample of labeled training data classes using a layer of the particular machine learning classification model,
randomly selecting samples from the plurality of vectors into a set of samples,
computing at least one distance for each sampled class from a center parameter for the class using the set of samples,
generating a discrete probability distribution over the classes for a query point based on distances to a center parameter for each of the classes in the embedding space,
calculating a loss value for the network, the calculation of the loss value being for a fixed geometry of the embedding space and including a measure of the difference between distributions, and
back propagating at least a derivative of the loss value to the embedding to adjust weights of the embedding.

15. The provider network of claim 14, wherein after training the particular machine learning classification model using a network, the provider network is to:
receive a classification request to classify data using the trained particular machine learning classification model, the request including data to classify;
classify the data using the embedding of the trained particular machine learning classification model to produce a result; and
return the result according to the classification request.

16. The provider network of claim 15, wherein after training the particular machine learning classification model using a network, the provider network is to:
receive a classification request to classify data using the trained particular machine learning classification model, the request including an identification of location of data to classify;
retrieve the data at the identified location;
classify the data using the embedding of the trained particular machine learning classification model to produce a result; and
return the result according to the classification request.

17. The provider network of claim 15, wherein the distances are squared Euclidean distances and the fixed geometry is a sphere.

18. The provider network of claim 15, wherein the particular machine learning classification model is an image classification model.

19. The provider network of claim 15, wherein the measure of the difference between distributions is an entropy function.

20. The provider network of claim 15, wherein the particular machine learning classification model is a neural network.

* * * * *